Nov. 27, 1956     T. P. FARKAS     2,772,378
SPEED CONTROL CIRCUITS
Filed Dec. 11, 1951
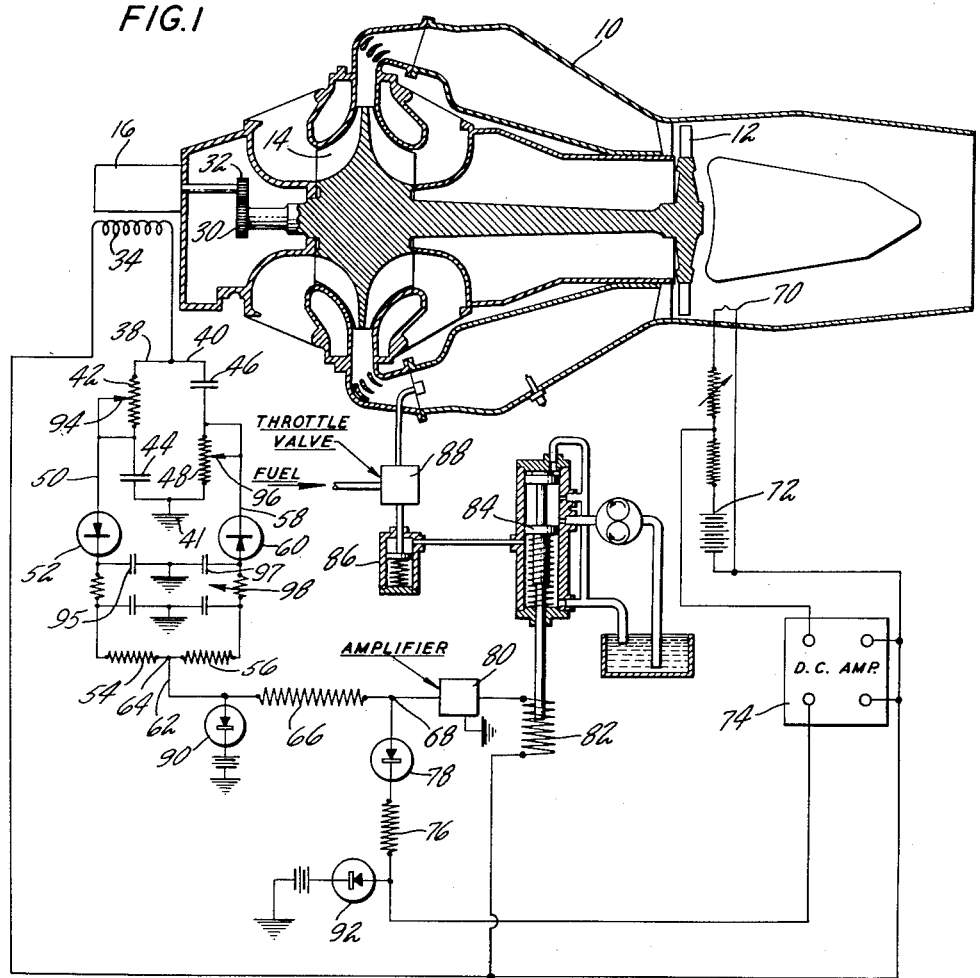
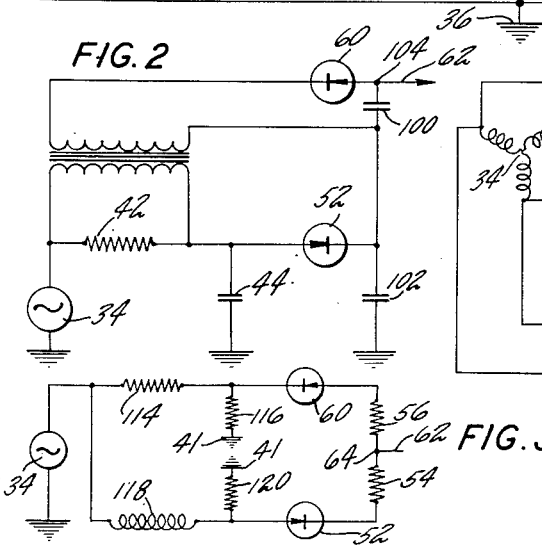
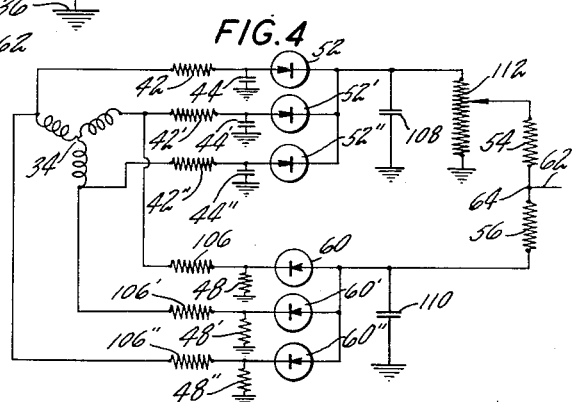
INVENTOR
THOMAS P. FARKAS
BY Harris G. Luther
ATTORNEY

United States Patent Office 2,772,378
Patented Nov. 27, 1956

2,772,378

SPEED CONTROL CIRCUITS

Thomas P. Farkas, Bloomfield, Conn., assignor to United Aircraft Corporation, East Hartford, Conn., a corporation of Delaware Application December 11, 1951, Serial No. 261,020

6 Claims. (Cl. 317—5)

This invention relates to speed control mechanism and particularly to mechanism utilizing frequency responsive devices.

An object of this invention is to provide a speed control mechanism which is responsive to the frequency of an electric impulse related to the speed to be controlled but is substantially unaffected by incident variations in voltage.

A further object is an electric network utilizing a reactance to obtain voltage variations from frequency variations and utilizing parallel circuits to neutralize voltage variations at the frequency source to obtain a null voltage signal which will not vary with voltage variations of the source.

A further object is a speed control electric network having means for adjusting the network frequency response to select any desired speed as the control speed.

A further object is to provide an improved frequency responsive signal generator for use in a comparison-selection circuit of an engine control mechanism.

Other objects and advantages will be apparent from the following specification, claims and drawings in which, Fig. 1 is a schematic view partly in section of a turbine engine and the fuel control therefor incorporating the improved frequency responsive circuit.

Fig. 2 is a schematic wiring diagram of a modified form of the frequency responsive circuit.

Fig. 3 is a schematic wiring diagram of a further modification of the frequency responsive circuit.

Fig. 4 is a schematic diagram showing the frequency responsive circuit incorporated into a three-phase system.

The speed responsive signal generator disclosed and claimed herein is shown as incorporated in the fuel control device and the comparison-selection circuit described and claimed in the copending application Serial No. 205,521 of Stanley G. Best, filed January 11, 1951. The signal generator of that application relies on a voltage which varies substantially directly in proportion to the engine speed as its source of a speed signal. The present invention is an improved circuit in which the speed signal is obtained from an alternating current frequency which varies directly in proportion to the engine speed and because the generator is usually geared to the engine, the frequency will be a more accurate representation of the engine speed than the voltage. As in the structure of the copending application the speed signal may be put through a combining circuit and utilized to control the fuel flow to the engine and hence control the engine speed.

In the structure disclosed a turbine-compressor unit 10 having a turbine 12 and a compressor 14 drives a speed signal generating unit 16 which will create a signal having a frequency which will vary in accordance with the turbine speed. The generator 16 which is driven from the engine by gears 30 and 32 generates an alternating current which has a frequency directly proportional to the engine speed. This generator is preferably of the permanent magnet type in which the permanent magnet is rotated and is surrounded by stationary coils 34 in which the alternating current is induced, thus eliminating the necessity for brushes.

One side of the generator is grounded at 36 and the output from the other side of the generator is fed into two parallel voltage divider circuits 38 and 40 which are grounded at 41. These two divider circuits contain elements such that the divider ratio as a function of frequency is different in each divider. Therefore the output of the two dividers are equal at only one frequency which is the frequency produced by the generator at the preselected speed to which the engine is to be regulated. In Fig. 1 each of these parallel circuits is shown as consisting of a resistor and a capacitor, a circuit 38 having a resistor 42 and a capacitor 44 in series therein and circuit 40 having a capacitor 46 and a resistor 48 arranged in series in the opposite order to the arrangement shown in circuit 38. While these divider circuits have each been shown as consisting of one resistor and one capacitor, it should be understood that one or both of them might consist of one inductance and one resistor or one of the circuits might consist of two resistors. The output of these dividers are rectified and compared. The rectification and comparison circuits comprise a line 50 connected at an intermediate point of the voltage divider 38, a rectifier 52 and a resistor 54 forming with a resistor 56 a comparison circuit. A connection 58 connects the intermediate point of the voltage divider circuit 40 with a rectifier 60 and the resistor 56. The D. C. output of the comparison circuit is taken through a conductor 62 from a point 64 between the resistors 54 and 56. This D. C. output of the comparison circuit is zero when the frequency of the generator 16 is at the preselected frequency and will be positive when the frequency varies in one direction and negative when it varies in the opposite direction. The relation between the speed variation and the polarity of the signal may be determined by the connections for the rectifiers 52 and 60. In the device shown in Fig. 1 the arrows in the rectifier indicate current flow and provide a negative polarity on the right-hand end of resistor 56 and a positive polarity on the left-hand end of resistor 54. An increase of frequency produced in the coils 34 will result in a smaller voltage drop across the capacitor 44 and a smaller voltage at the midpoint of the divider circuit 38. In the same manner the voltage at the intermediate point of the divider circuit 40 will increase giving a greater voltage drop through resistor 48 and hence a higher voltage at the intermediate point of the divider circuit 40. This voltage shift will cause a decrease in the voltage appearing at the D. C. output point 64 or in other words will give a negative voltage for the D. C. output. In a similar manner, it will be evident that a decrease in speed will give a positive voltage for the D. C. output.

The voltage at the juncture 64 is led through conductor 62 and through a resistor 66 to the juncture 68 where it meets with the voltage from the temperature responsive mechanism.

As indicated in copending application Serial No. 205,521, a temperature responsive element 70 provides a signal which is compared with a datum provided by the battery 72 and led through an amplifier 74, a resistor 76 and a rectifier 78 to provide a temperature responsive signal. The speed responsive signals and the temperature responsive signals provide a negative signal on overspeed and overtemperature respectively and the network provided by resistors 66 and 76 and rectifier 78 will select the most negative signal as the one to govern. This signal after being amplified in an amplifier 80 is led to a proportional solenoid 82. The proportional solenoid controls a valve 84 to direct fluid to or drain fluid from a servomotor 86 which controls a throttle 88 controlling the flow of fuel to the turbine-compressor unit 10.

From this structure it will be apparent that the signal generators when properly combined will control the flow of fuel to the turbine and as the turbine speed and temperature are dependent upon the quantity of fuel consumed, it will be apparent that controlling the fuel will control both the speed and the temperature.

As more fully explained in copending application Serial No. 205,521 additional rectifiers 90 and 92 are provided in each of the signal networks (i. e. temperature and speed) and these act as limiters to limit the value of the positive signal to prevent a high positive signal in either network from adversely affecting the controlling signal in the other network.

If desired, either or both of the resistors 42 and 48 may be made adjustable as indicated at 94 and 96 to provide means for selecting the speed to be used as the control speed.

If desired, a filtering network indicated generally at 98 and which may include input condensers 95 and 97 may be added to the signal generator circuit.

In the modification shown in Fig. 2 a circuit incorporating a resistor 42 and a condenser 44 and a rectifier 52 similar to that disclosed in Fig. 1 receives a signal from generator 34. Instead of a similar parallel circuit, however, a high impedance transformer is shunted across the resistor 42 and the secondary of the transformer provides a signal which is rectified in the rectifier 60. The outputs of the rectifiers 52 and 60 are subtracted through capacitors 100 and 102 and the D. C. output is obtained between the juncture 104 and ground through the conductor 62. In this modification the signal rectified by the rectifier 52 will be the voltage across the capacitor 44 and the signal provided by the rectifier 60 will be the voltage across the secondary of the transformer. These can be made equal at some selected speed. An increase in speed with the consequent increase in frequency will provide a smaller voltage drop across the capacitor 44 and a greater voltage across the secondary of the transformer. These voltages will appear in the capacitors 102 and 100 and the rectifiers 52 and 60 are connected so that the capacitors will buck each other and the D. C. voltage appearing at juncture 104 and conductor 62 will be the difference between the capacitor voltages and will become negative on an increase in frequency and positive on a decrease in frequency. As in the modification shown in Fig. 1 the voltage in conductor 62 is led through one end of the resistor 66 and hence to the juncture 68 where it is joined with the temperature responsive signal.

In the modification shown in Fig. 3 the alternating current from generator 34 is fed into two parallel divider circuits in a manner similar to that shown in Fig. 1. In the Fig. 3 modification, however, one divider circuit comprises two resistors 114 and 116 connected across the generator and the other divider circuit comprises an inductance 118 and a resistor 120. These divider circuits are connected into rectifiers 52 and 60 and resistors 54 and 56, the same as is described in Fig. 1. The D. C. output signal is obtained through conductor 62 connected to juncture 64 in the manner previously described.

In the modification shown in Fig. 4 the general parallel circuit arrangement of Fig. 1 is shown as incorporated in a three-phase system. One of the legs of the parallel circuit comprises resistors 42, 42' and 42", condensers 44, 44' and 44" and rectifiers 52, 52' and 52" as in Fig. 1. The other leg of the parallel circuit comprises resistors 106, 106' and 106" in place of the capacitor 46 as shown in Fig. 1 but utilizes resistors 48, 48' and 48" and rectifiers 60, 60' and 60" in a manner similar to that shown in Fig. 1. Condensers 108 and 110 are filtering condensers. An adjustable resistor 112 is utilized for the speed selection. The outputs of the two networks are led through resistors 54 and 56. The D. C. output is taken through a conductor 62 from juncture 64 in the same manner as explained in connection with Fig. 1. As previously, the signal in conductor 62 is led to resistor 66 and hence to the juncture 68 where it is combined with the signal from the speed generator.

It should be noted that although the network has been described as utilizing the least positive or most negative signal as the controlling signal by a proper arrangement of rectifiers, it would be possible to use the most positive or least negative signal as the controlling signal.

Although only three arrangements of one embodiment of this invention have been illustrated and described herein, it will be apparent that various changes and modifications may be made in the configuration and arrangement of the component parts without departing from the scope of this novel concept.

What it is desired to obtain by Letters Patent is:

1. In combination with an engine driven alternating current generator having a grounded connection, a pair of electric circuits having one side grounded and the other side directly connected to said generator, one of said circuits having two separate impedances one of which has a reactance variable with the frequency of the generator, frequency variations causing the voltage drop across said reactance to vary with respect to the voltage drop across a selected portion of the other of said pair of circuits, a rectifier and an impedance in series and shunted across said reactance and a rectifier and an impedance in series and shunted across said selected portion, said last mentioned impedances being connected together at one end, a connection having a common line forming a part of a grounded circuit through both of said last mentioned impedances providing a D. C. voltage with respect to ground proportional to the algebraic sum of the voltages across said last mentioned impedances, and means actuated by said D. C. voltage for controlling the speed of said engine and the frequency of said alternating current.

2. In combination with an engine driven alternating current generator having one side grounded, a pair of circuits having one side grounded and the other side directly connected to said generator, one circuit incorporating a capacitor to provide a voltage drop which will vary inversely with the frequency, the other circuit of said pair having a portion with a voltage drop which will vary directly with the frequency of the alternating current, a rectifier and an impedance shunted across said capacitor, a rectifier and an impedance shunted across said portion, said last mentioned impedances being connected together to compare said voltage drops and a connection between said last mentioned impedances and ground providing a D. C. signal varying with frequency and producing a null voltage independent of the alternating current amplitude and means responsive to said signal for controlling the speed of said engine.

3. In a speed control circuit, a source of alternating voltage having a grounded side and having a frequency which is a function of the speed to be controlled, means creating a direct current signal varying in extent and direction with respect to ground with the extent and direction of variation, from a preselected value, of the speed which is to be controlled comprising, a first voltage divider connected directly across said alternating voltage and having one side grounded and having one portion whose reactance varies inversely with frequency, a second voltage divider connected directly across said alternating voltage and having one side grounded, a third voltage divider having one end connected to an intermediate point of said first voltage divider at the ungrounded side of said portion, a rectifier preventing current flow in one direction between said first divider and said one end, the other end of said third voltage divider being connected to an intermediate point of said second voltage divider, a rectifier preventing current flow in the opposite direction between said second divider and said other end and a signal output connection between an intermediate point of said third voltage divider and the grounded side of said source and the grounded side of said portion.

4. A combination as claimed in claim 1 in which said rectifiers are arranged to provide current flow in opposite directions in said common return path to thereby provide a D. C. voltage output varying with frequency.

5. In combination with an engine driven alternating current generator having one side grounded, two A. C. voltage divider circuits connected in parallel having one side directly connected to said generator and the other side connected to ground, one circuit comprising a capacitor and a resistor in series to act as a voltage divider, the other circuit comprising a resistance voltage divider, a D. C. voltage divider comprising a resistance connected between two rectifiers arranged to pass current in one direction through said D. C. voltage divider, one rectifier being connected to one A. C. voltage divider and the other rectifier being connected to the other A. C. voltage divider, and means connected with said D. C. voltage divider for controlling said generator speed.

6. A device as in claim 5 in which one of the resistors is made variable to select the generator speed.

References Cited in the file of this patent

UNITED STATES PATENTS

| | | |
|---|---|---|
| 2,363,652 | Crosby | Nov. 28, 1944 |
| 2,382,847 | Baumann | Aug. 14, 1945 |
| 2,397,840 | Crosby | Apr. 2, 1946 |
| 2,413,913 | Duke | Jan. 7, 1947 |
| 2,431,501 | Phillips | Nov. 25, 1947 |
| 2,496,730 | Lindbeck | Feb. 7, 1950 |
| 2,610,315 | McKendry | Sept. 9, 1952 |
| 2,654,841 | Dutton | Oct. 6, 1953 |